(12) United States Patent
Raza et al.

(10) Patent No.: US 8,270,377 B1
(45) Date of Patent: Sep. 18, 2012

(54) MULTIPLE COMMUNICATION SESSIONS IN WIRELESS COMMUNICATION DEVICES

(75) Inventors: Syed Hassan Raza, Leawood, KS (US); Nasir Mahmood Mirza, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 420 days.

(21) Appl. No.: 12/620,190

(22) Filed: Nov. 17, 2009

(51) Int. Cl.
*H04B 7/216* (2006.01)

(52) U.S. Cl. .......................................... 370/335

(58) Field of Classification Search .................. None
See application file for complete search history.

(56) References Cited

U.S. PATENT DOCUMENTS

| | | | |
|---|---|---|---|
| 5,711,012 | A | 1/1998 | Bottoms et al. |
| 6,112,084 | A | 8/2000 | Sicher et al. |
| 6,791,968 | B2 | 9/2004 | Kotzin |
| 6,847,821 | B1 | 1/2005 | Lewis et al. |
| 2006/0221939 | A1 | 10/2006 | Rosen et al. |

*Primary Examiner* — Hassan Phillips
*Assistant Examiner* — Prenell Jones

(57) ABSTRACT

What is disclosed is a method of operating a communication system. The method includes receiving a first request to initiate a first communication session with a wireless communication device, determining a first spreading code for the first communication session, and transferring the first spreading code for delivery to the wireless communication device. The method also includes receiving a second request to initiate a second communication session with the wireless communication device, determining a second spreading code for the second communication session, where the second spreading code is determined based upon the first spreading code, and transferring the second spreading code for delivery to the wireless communication device.

20 Claims, 6 Drawing Sheets

MULTIPLE COMMUNICATION SESSIONS IN WIRELESS COMMUNICATION DEVICES

TECHNICAL FIELD

Aspects of the disclosure are related to the field of communications, and in particular, multiple wireless communication sessions of wireless communication devices in wireless communication networks.

TECHNICAL BACKGROUND

Wireless communication networks typically enable wireless communication devices, via a wireless communication system, to communicate with further communication networks and equipment. The wireless communication system typically includes antennas, base stations, wireless access nodes, and other associated equipment to route communications over wireless links from the wireless communication devices to further communication networks, equipment, and destinations. Each wireless communication device typically exchanges communications with one wireless access node at a time, while many wireless communication devices can be in communication with the same access node simultaneously.

The wireless communication system typically employs various communication protocols to facilitate communication over wireless links with wireless communication devices. These communication protocols many times include features to ensure reliable communications as well as share the wireless links among many wireless communication devices simultaneously. In order to support the many wireless communication devices communicating with the wireless communication system simultaneously, some of the various communication protocols employ spread spectrum features.

These spread spectrum features are typically used to spread the energy of communications over a large portion of the available bandwidth of the wireless link in an effort to minimize interference, jamming, detection, and crosstalk among the possibly many wireless communication devices. These spread spectrum protocols also employ a spreading code to determine how to spread the energy across the available bandwidth. This spreading code typically comprises a random or pseudo-random sequence to spread the RF energy in a similarly random or pseudo-random fashion.

Overview

What is disclosed is a method of operating a communication system. The method includes receiving a first request to initiate a first communication session with a wireless communication device, determining a first spreading code for the first communication session, and transferring the first spreading code for delivery to the wireless communication device. The method also includes receiving a second request to initiate a second communication session with the wireless communication device, determining a second spreading code for the second communication session, where the second spreading code is determined based upon the first spreading code, and transferring the second spreading code for delivery to the wireless communication device.

What is also disclosed is a method of operating a communication system. The method includes, in a wireless communication device, requesting to initiate a voice call through a wireless access system, receiving a first spreading code for the voice call, and exchanging communications of the voice call through the wireless access system using the first spreading code. The method also includes, in the wireless communication device, requesting to initiate a data session through the wireless access system, where the data session is at least partially concurrent with the voice call, receiving a second spreading code for the data session, wherein the second spreading code is determined based upon the first spreading code, and exchanging communications of the data session through the wireless access system using the second spreading code.

What is also disclosed is a communication system. The communication system includes a wireless communication device configured to transfer a first request for a first communication session to a wireless access system, receive a first spreading code for the first communication session, and exchange communications of the first communication session using the first spreading code. The wireless access system is configured to establish the first communication session with the wireless communication device based upon the first request, determine the first spreading code, transfer the first spreading code for delivery to the wireless communication device, and exchange the communications of the first communication session with the wireless communication device using the first spreading code. The wireless communication device is also configured to transfer a second request for a second communication session to the wireless access system, receive a second spreading code for the second communication session, and exchange communications of the second communication session using the second spreading code, wherein the second communication session is at least partially concurrent with the first communication session. The wireless access system is also configured to establish the second communication session with the wireless communication device based upon the second request, determine the second spreading code based upon the first spreading code, transfer the second spreading code for delivery to the wireless communication device, and exchange the communications of the second communication session with the wireless communication device using the second spreading code.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
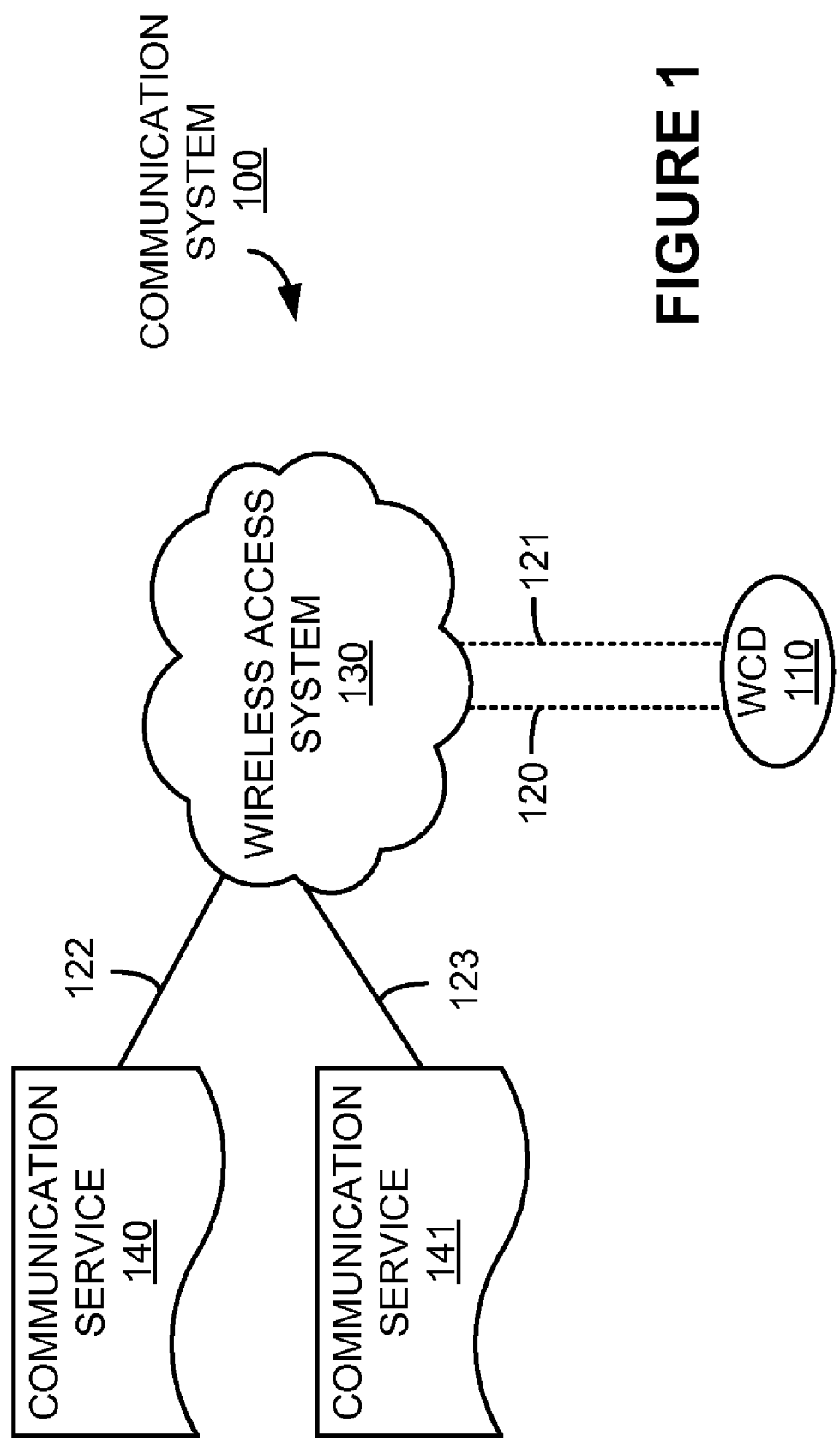
FIG. 1 is a system diagram illustrating a communication system.

FIG. 1 is a system diagram illustrating communication system 100. Communication system 100 includes wireless communication device (WCD) 110, wireless access system 130, and communication services 140-141. Wireless communication device 110 and wireless access system 130 communicate over wireless links 120-121. Wireless access system 130 and communication services 140-141 communicate over links 122-123, respectively. In FIG. 1, when wireless communication device 110 desires to initiate a communication session through wireless access system 130, a registration process typically occurs. The communication session can allow wireless communication device 110 to access communication services 140-141 through wireless access system 130. In many examples, a spreading code is used to encode communications exchanged over a wireless link, such as in a spread spectrum encoding or modulation scheme. Also, in some examples, a base station or wireless access node is included in wireless access system 130 to handle wireless links 120-121 between wireless access system 130 and wireless communication device 110.

Figure 2:
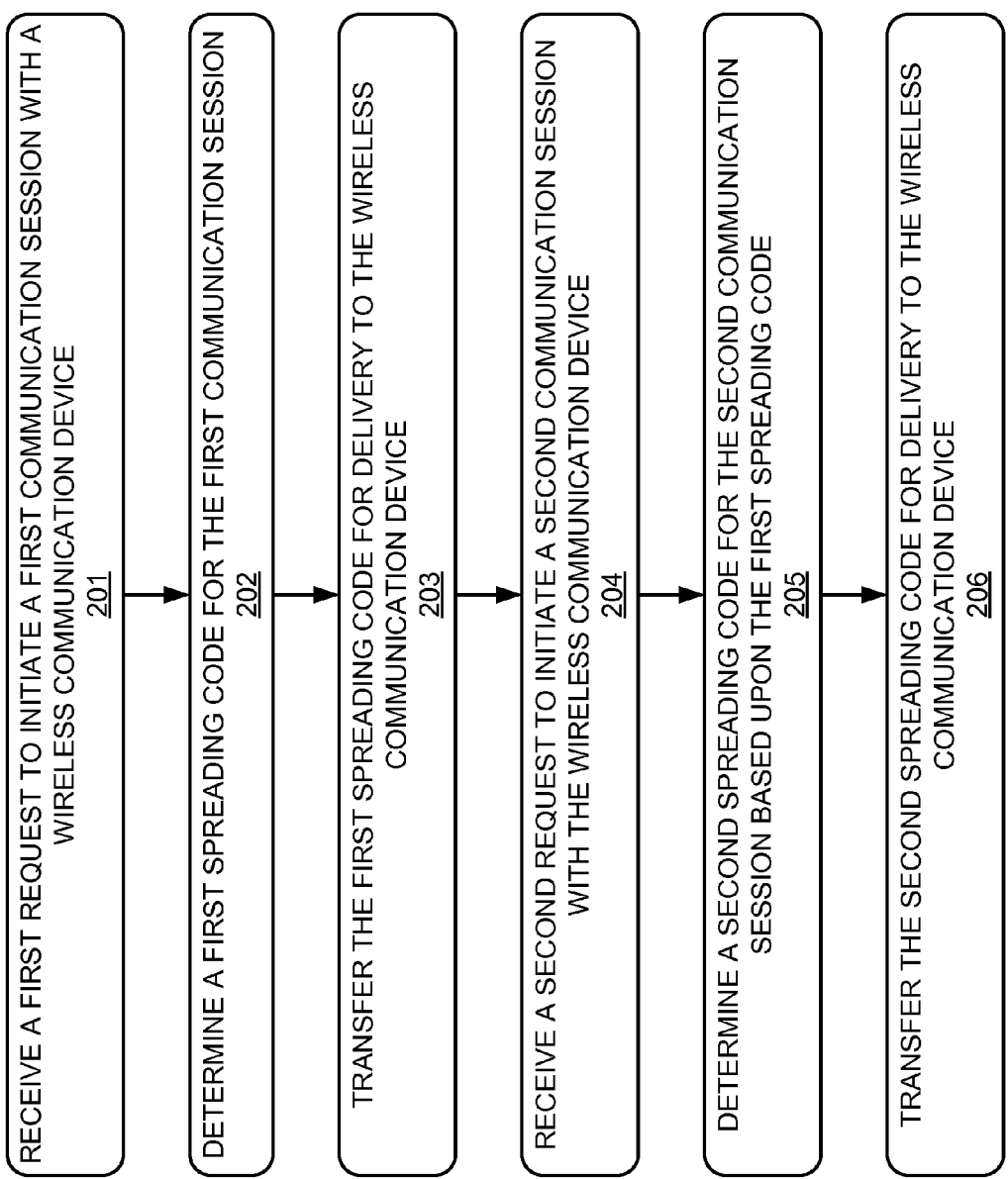
FIG. 2 is a flow diagram illustrating a method of operation of a communication system.

FIG. 2 is a flow diagram illustrating a method of operation of communication system 100. The operations of FIG. 2 are referenced herein parenthetically. In FIG. 2, wireless access system 130 receives (201) a first request to initiate a first communication session with wireless communication device 110. In this example, wireless communication device 110 transfers the first request to initiate the first communication session over wireless link 120. In some examples, the first request to initiate the first communication session is transferred over an overhead communication portion of wireless link 120. Wireless access system 130 determines (202) a first spreading code for the first communication session. The first spreading code could be determined based upon the first request in some examples, while in other examples, the first spreading code is determined prior to receiving the first request. Wireless access system 130 then transfers (203) the first spreading code for delivery to wireless communication device 110. In this example, the first spreading code is transferred over wireless link 120 for receipt by wireless communication device 110.

Wireless access system 130 also receives (204) a second request to initiate a second communication session with wireless communication device 110. In this example, wireless communication device 110 transfers the second request to initiate the second communication session over wireless link 121. In some examples, the second request to initiate the second communication session is transferred over an overhead communication portion of wireless link 121. Wireless access system 130 determines (205) a second spreading code for the second communication session. The second spreading code is determined based upon the first spreading code in this example. Wireless access system 130 then transfers (206) the second spreading code for delivery to wireless communication device 110. In this example, the second spreading code is transferred over wireless link 121 for receipt by wireless communication device 110. The first and second communication sessions could be at least partially concurrent with each other.

In further examples, wireless communication device 110 could exchange communications of the first communication session over wireless link 120. Wireless access system 130 could exchange communications of communication service 140 over link 122 for the first communication session. Wireless communication device 110 could also exchange communications of the second communication session over wireless link 121. Wireless access system 130 could exchange communications of communication service 141 over link 123 for the second communication session. Communications of the first communications session are exchanged over wireless link 120 using the first spreading code in this example, while communications of the second communication session are exchanged over wireless link 121 using the second spreading code. Although two wireless links 120-121 are shown in FIG. 1, it should be understood that these separate wireless links are merely illustrative to show two communication sessions. In other examples, a single wireless link could be shown, with portions of the single wireless link used for two communication sessions and associated overhead communications.

Figure 3:
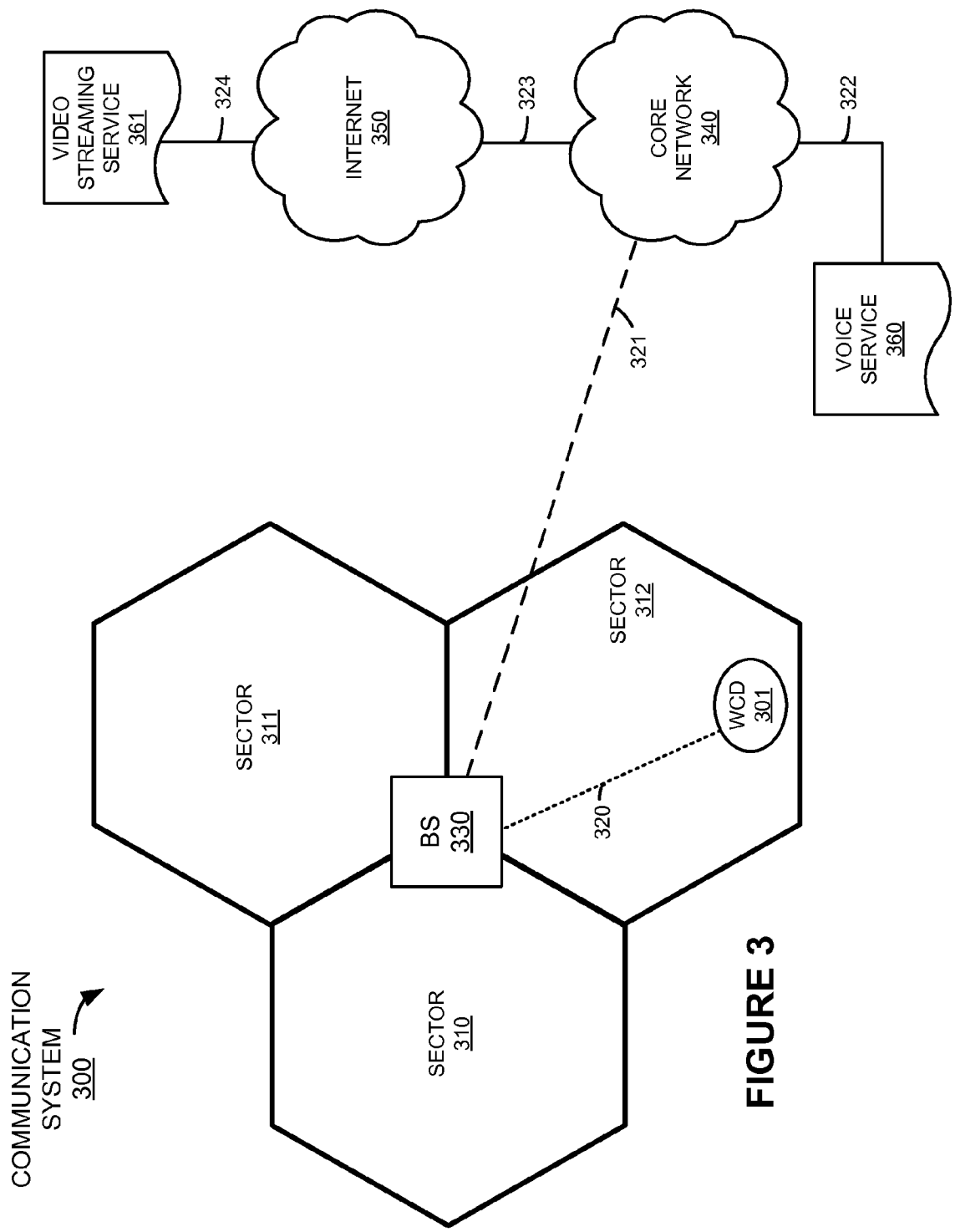
FIG. 3 is a system diagram illustrating a communication system.

FIG. 3 is a system diagram illustrating communication system 300. Communication system 300 includes wireless communication device (WCD) 301, base station (BS) 330, core network 340, Internet 350, voice service 360, and video streaming service 361. Base station 330 and core network 340 communicate over link 321. In this example, link 321 is a T1 backhaul link. Core network 340 and voice service 360 communicate over link 322. In this example, link 322 includes a circuit-switched local loop of a local telecommunications provider. Core network 340 and Internet 350 communicate over link 323. In this example, link 323 is a metropolitan-area network (MAN) optical network link. Internet 350 and video streaming service 361 communicate over link 324. In this example, link 324 is an optical networking link capable of carrying Internet protocol (IP) packets. Wireless communication device 301 and base station 300 communicate over wireless link 320. Wireless communication device 301 communicates using the code-division multiple access (CDMA) wireless protocol, although other wireless protocols could be employed. Also in this example, wireless communication device 301 is a mobile smartphone.

As shown in FIG. 3, base station 330 has a limited geographic range over which wireless access is provided to wireless communication devices. The limited range is divided into three portions as indicated by the hexagonal-shaped sectors 310-312 in FIG. 3. Although hexagonal regions defining the sectors is shown in FIG. 3, it should be understood that the sectors could be of other shapes and configurations, as determined by geographic features, empirical data, radio frequency (RF) conditions, the associated equipment, or by other factors, including combinations thereof. Although not shown for clarity, base station 330 can provide wireless communication access for other wireless communication devices that may be located within any of sectors 310-312. Base station 330 could include RF communication and control circuitry, antennas, and typically includes wireless communications equipment capable of communicating with and providing communication service to wireless communication devices.

Core network 340 is a core network of a wireless access system in this example. Core network 340 could include further base stations, routers, gateways, controller systems, processing systems, or other communication equipment. Internet 350 includes the Internet and could also include associated routers, gateways, communication links, servers, or other communication equipment for exchanging and routing IP data packets. Voice service 360 includes equipment and systems to provide voice calls to local subscribers over circuit-switched telephony links. Voice service 360 could include an end-user, such as a telephone in a residence or business. Video streaming service 361 includes computer equipment, application servers, storage systems, and other video streaming equipment for hosting and serving video or other multimedia content over link 324 and Internet 350. In some examples, video streaming service 361 includes live-video production and digitization equipment and systems for streaming video of live events, such as sporting events, news, or other content.

Figure 4:
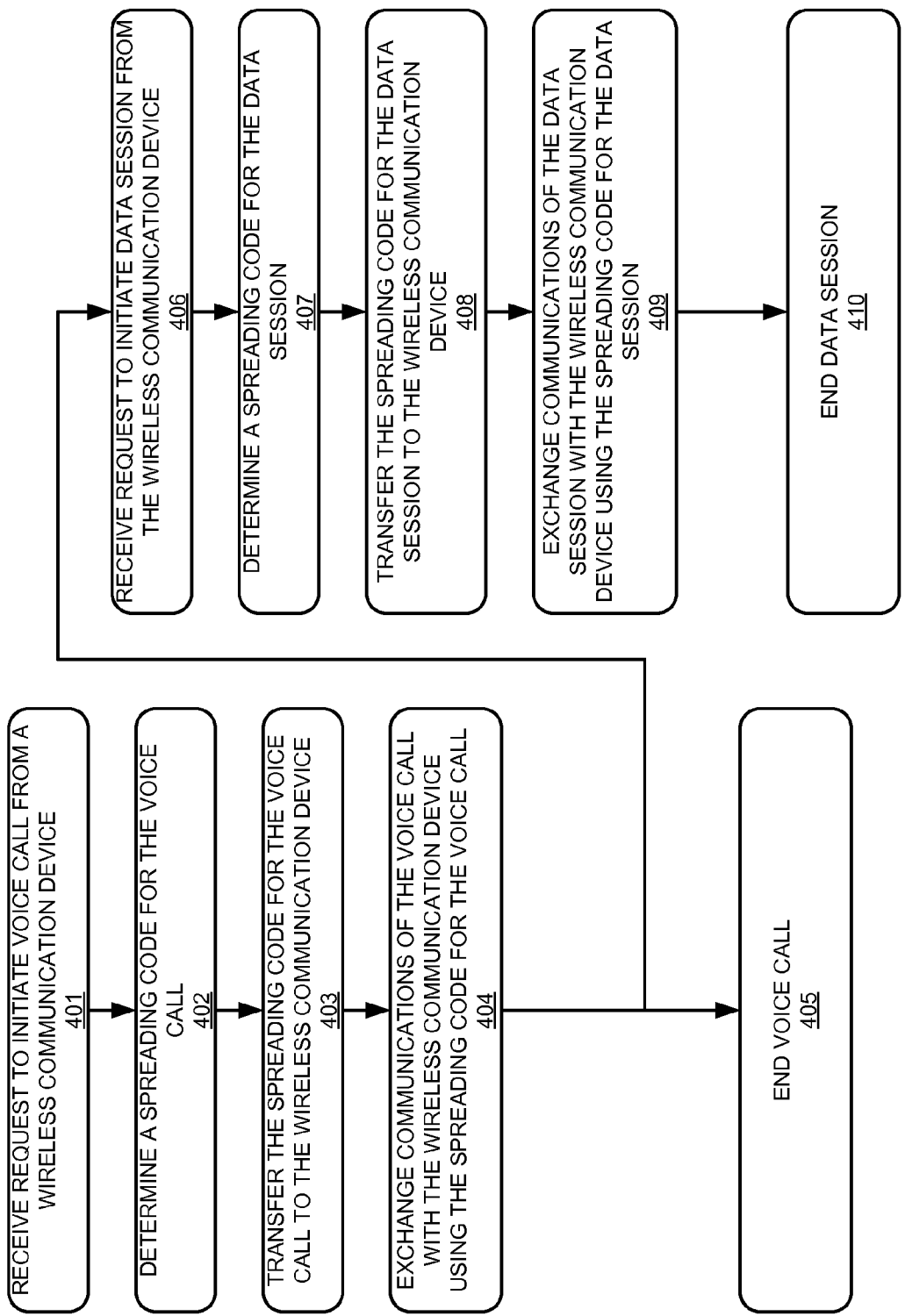
FIG. 4 is a flow diagram illustrating a method of operation of a communication system.

FIG. 4 is a flow diagram illustrating a method of operation of communication system 300. The operations included in FIG. 4 are referenced herein parenthetically. In FIG. 4, base station 330 receives (401) a first request to initiate a voice call session from wireless communication device 301. The request includes information indicating that wireless communication device 301 desires to initiate a voice call with voice service 360. In some examples, the request could include a phone number of voice service 360, a network address of voice service 360, or other identifier of voice service 360 or of an end-user associated with voice service 360. In some examples, the request is preceded by a detection process whereby wireless communication device 301 detects base station 330, such as by a pilot or beacon signal transmitted by base station 330. Wireless communication device 301 can also exchange additional information with base station 330 regarding initiating communications over a wireless link with base station 330. This information could include frequency assignments, channel assignments, carrier information, security information, spreading codes, long codes, short codes, Walsh codes, or other information.

Base station 330 determines (402) a first spreading code. This first spreading code is for the voice call as requested by wireless communication device 301. The spreading code for the voice call is used to encode or modulate at least user communication portions of the voice call over wireless link 320. In this example, the voice call represents an application type of the communication session associated with the voice call. An application type comprises a type of user service or user communications as implemented in communications transferred between wireless communication device 301 and base station 330. The user services, for example, could include Internet communications, voice calls, telephony, video, audio, email, text, chat data, web pages, peer-to-peer (P2P) communications, voice over packet, voice over IP (VoIP), as well as other data and application types, including combinations thereof. The application could also be distinguished among different service providers, even though the service providers provide similar types of user services. For example, although VoIP is a type of user service, various service providers, could also be distinguished from each other, much like the individual user services. Base station 330 could determine the spreading code for the voice call based upon the application of the voice call, namely voice communications. A spreading code could also be determined by base station 330 based upon the activity level of a sector in which wireless communication device 301 is presented located, or based upon other factors.

In many examples, the quality of wireless communications can be influenced by the quality of the spreading code used for a communication session. Several spreading code quality factors or metrics can impact a spreading code and the spreading code effectiveness over a wireless link. These quality factors include auto-correlation, cross-correlation, crest factor, and diversity, among other factors. The factors could also be periodic or aperiodic. Correlation is typically defined as a relationship between spreading codes, and how closely communications encoded or modulated with spreading codes relate to one another—cross-correlation relates to how different communication sessions correlate to one another over a time frame, and auto-correlation relates to how a communication session correlates to itself over a time frame. Crest factor relates to the ratio of the peak power of a communication session to an average power of the communication session. Diversity relates to the amount of energy spreading over a particular bandwidth that a spreading code achieves for a communication session. Base station 330 could determine the first spreading code by optimizing the first spreading code for a diversity quality factor and a cross-correlation quality factor when the application type indicates a voice call, voice over IP (VoIP) communications, or other voice session. In other examples, base station 330 could determine the first spreading code by optimizing the first spreading code for an auto-correlation quality factor and a diversity quality factor when the application type indicates web page communications or other data communications.

Also in this example, the spreading code could be an alternate to a conventional Walsh code. Walsh codes typically include conventional predetermined spreading codes used in some wireless protocols for channelization of wireless links. Walsh codes provide orthogonality between different wireless communication devices communicating though a base station, and typically provide zero cross-correlation between Walsh codes. In other examples, the spreading code for the voice call could be the long code or the short code of the CDMA wireless protocol. The spreading codes discussed herein could also be based upon a conventional Walsh code and processed based upon an application type, quality factor, sector activity level, or other factor into a specialized spreading code. Although in this example, base station 330 determines the spreading code for the voice call, it should be understood that other equipment or systems in communication system 300 could determine the spreading code for the voice call, such as core network 340. Base station 330 could receive the spreading code from core network 340.

Base station 330 then transfers (403) the spreading code for the voice call to wireless communication device 301. Wireless communication device 301 receives this spreading code over wireless link 320. The spreading code could be transferred during the registration process of wireless communication device 301, after wireless communication device 301 transfers the request to initiate the voice call to base station 330, or a different time. Wireless communication device 301 and base station 330 exchange (404) communications of the voice call using the first spreading code for the voice call. In this example, communications of the voice call includes voice communications with voice service 360 through base station 330 and core network 340. In further examples, the voice call could include a VoIP call handled by voice service 360. A VoIP call could comprise a data session over wireless link 320.

During the exchange of communications of the voice call, base station 330 receives (406) another request from wireless communication device 301 to initiate a second communication session with wireless communication device 301. The second request includes information indicating that wireless communication device 301 desires to initiate a data session with video streaming service 361. In some examples, the second request could include a phone number of video streaming service 361, a network address of video streaming service 361, or other identifier of video streaming service 361. In some examples, the second request could also be preceded by another detection process whereby wireless communication device 301 again detects base station 330, such as by a pilot or beacon signal as transmitted by base station 330. Wireless communication device 301 can also exchange additional information with base station 330 regarding initiating communications over a wireless link with base station 330. As with the first request, this information could include frequency assignments, channel assignments, carrier information, security information, spreading codes, long codes, short codes, Walsh codes, or other information.

Base station 330 determines (407) a second spreading code. This second spreading code is for the data session as requested by wireless communication device 301. In this example, the spreading code for the data session is determined by at least processing the first spreading code—the spreading code of the voice call. In some examples, base station 330 determines the second spreading code by optimizing the second spreading code so as to have a low cross-correlation with the first spreading code. The request to initiate the data session could also include an application type as discussed above for the request to initiate the voice call. As with the voice call described above, the application type could indicate a type of user service or user communications as implemented in communications transferred between wireless communication device 301 and base station 330. In examples where an application type is included in the request, or determined by base station 330, the second spreading code could be determined based upon the first spreading code and the application type of the data session. Base station 330 could determine the second spreading code based upon the first spreading code and by optimizing the second spreading code for an auto-correlation quality factor and a diversity quality factor when the data session application type indicates web page communications, or other data communications. In other examples, base station 330 could determine the second spreading code upon the first spreading code and by optimizing the second spreading code for a diversity quality factor and a cross-correlation quality factor when the data session application type indicates a voice call, voice over IP (VoIP) communications or other voice session. In yet further examples, base station 330 could determine the second spreading code based upon the first spreading code and based upon the activity level of a sector in which wireless communication device 301 is presented located. It should be understood that base station 330 could omit processing the first spreading code in determining the second spreading code.

Base station 330 then transfers (408) the spreading code for the data session to wireless communication device 301. Wireless communication device 301 receives this spreading code over wireless link 320. The spreading code for the data session could be transferred during the registration process of wireless communication device 301, after wireless communication device 301 transfers the request to initiate the data session to base station 330, or a different time. Wireless communication device 301 and base station 330 exchange (409) communications of the data session using the second spreading code for the data session. In this example, communications of the data session include multimedia data streamed between wireless communication device 301 and video streaming service 361 through base station 330, Internet 350, and core network 340.

As described above, the voice call and the data session of wireless communication device 301 are at least partially concurrent in FIG. 4. The voice call and the data session could end (405, 410) at different times as shown in FIG. 4. In some examples, the voice call and the data session are simultaneous, and could start or end at similar times. In further examples, multiple communication sessions could be initiated between wireless communication device 301 and a single service provider, such as video streaming service 361 streaming multiple video feeds. A video stream and an audio stream of a multimedia session could be exchanged across different communication sessions and use different spreading codes as described above. In yet further examples, multiple voice calls could be handled on wireless communication device 301, such as a conference call, where each voice call is exchanged over a separate wireless link and different spreading code.

The descriptions herein discuss using different spreading codes for two or more communication sessions on a single wireless communication device. However, in wireless communication protocols that do not employ spreading codes, a different way of handling multiple communication sessions could be employed. For example, multiple transceiver portions of wireless communication device could be included in wireless communication device 301, with an individual transceiver portion handling an individual communication session. Multiple antennas could also be employed by wireless communication device 301. Additionally, although two partially concurrent communication sessions are discussed herein, it should be understood that more than two communication sessions could be initiated between wireless communication device 301 and base station 330. More than two spreading codes could be determined, with each additional spreading code based upon at least a spreading code which is in present use by wireless communication device 301. Advantageously, a single wireless communication device can communicate over multiple communication sessions, such as a voice call and data session, while maintaining a high quality of service for all concurrent communication sessions by determining spreading codes as discussed herein.

Figure 5:
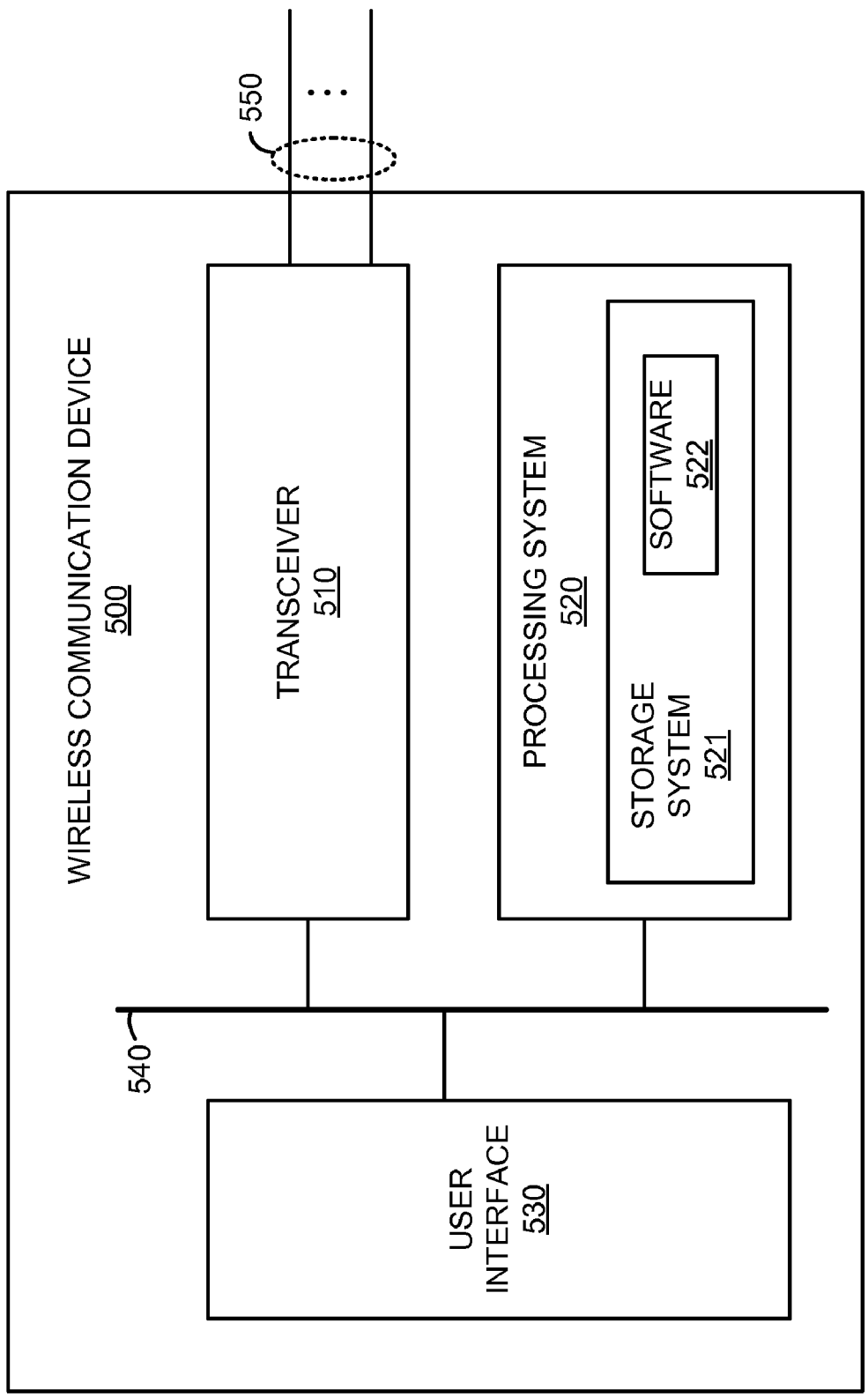
FIG. 5 is a block diagram illustrating a wireless communication device.

FIG. 5 is a block diagram illustrating wireless communication device 500, as an example of wireless communication device 110 found in FIG. 1 or wireless communication device 301 in FIG. 3, although wireless communication devices 110 and 301 could use other configurations. Wireless communication device 500 includes transceiver 510, processing system 520, and user interface 530. Transceiver 510, processing system 520, and user interface 530 communicate over bus 540. Wireless communication device 500 may be distributed or consolidated among devices that together form elements 510, 520-522, 530, 540, and 550.

Transceiver 510 comprises radio frequency (RF) communication circuitry and antenna elements. Transceiver 510 could also include amplifiers, filters, modulators, and signal processing circuitry. In this example, transceiver 510 can exchange instructions and information with processing system 520. Transceiver 510 also communicates with a wireless access node, such as a base station, omitted for clarity, over wireless links 550. Transceiver 510 includes circuitry and equipment to transfer requests to initiate multiple communication sessions, as well as exchange user and overhead communications simultaneously over multiple wireless links 550 using different spreading codes. Wireless links 550 could use various protocols or communication formats as described herein for wireless links 120-121 or wireless link 320, including combinations, variations, or improvements thereof.

Processing system 520 includes storage system 521. Processing system 520 retrieves and executes software 522 from storage system 521. Processing system 520 could incorporate a computer microprocessor, logic circuit, or some other processing device, and may be distributed among multiple processing devices. Processing system 520 or user interface 530 could be located within the same equipment or circuitry in which transceiver 510 is located. Storage system 521 could include computer-readable media such as disks, tapes, integrated circuits, servers, or some other memory device, and also may be distributed among multiple memory devices. Software 522 may include an operating system, logs, utilities, drivers, networking software, and other software typically loaded onto a computer system. Software 522 could contain an application program, firmware, or some other form of computer-readable processing instructions. When executed by processing system 520, software 522 directs wireless communication device 500 to operate as described herein, such as initiate requests for communication sessions as well as handle multiple simultaneous communication sessions comprising user and overhead communications with transceiver 510 using different spreading codes.

User interface 530 includes equipment and circuitry for receiving user input and control. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 530 also includes equipment to communicate information to a user of wireless communication device 500. Examples of the equipment to communicate information to the user could include indicator lights, lamps, light-emitting diodes, displays, haptic feedback devices, audible signal transducers, speakers, buzzers, alarms, vibration devices, or other indicator equipment, including combinations thereof.

Bus 540 comprises a physical, logical, or virtual communication link, capable of communicating data, control signals, communications, and power, along with other information and signals. In some examples, bus 540 is encapsulated within the elements of transceiver 510, processing system 520, or user interface 530, and may be a software or logical link. In other examples, bus 540 uses various communication media, such as air, space, metal, optical fiber, or some other signal propagation path, including combinations thereof. Bus 540 could be a direct link or might include various equipment, intermediate components, systems, and networks.

Figure 6:
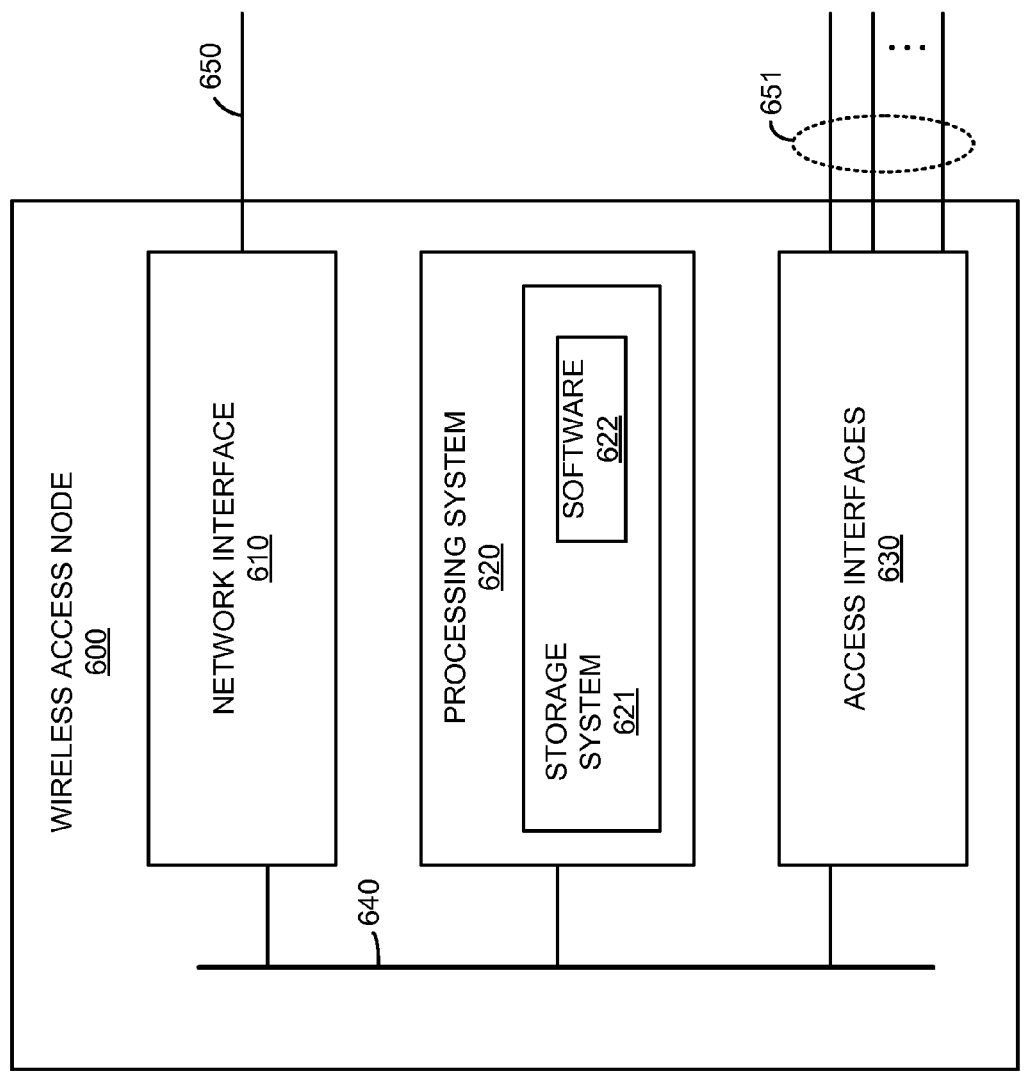
FIG. 6 is a block diagram illustrating a wireless access node.

FIG. 6 is a block diagram illustrating wireless access node 600, as an example of wireless access system 130 found in FIG. 1 or base station 330 found in FIG. 3, although wireless access system 130 or base station 330 could use other configurations. Wireless access node 600 includes network interface 610, processing system 620, and access interfaces 630. Network interface 610, processing system 620, and access interfaces 630 communicate over bus 640. Wireless access node 600 may be distributed among multiple devices that together form elements 610, 620-622, 630, 640, and 650-651.

Network interface 610 comprises network router and gateway equipment for communicating with a core network of a wireless communication provider, such as with other systems of wireless access system 130, communication services 140-141, or core network 340. Network interface 610 exchanges user communications and overhead communications with a core network of a wireless communication system to provide communication services, omitted for clarity, over link 650. Link 650 could use various protocols or communication formats as described herein for links 122-123 or 321, including combinations, variations, or improvements thereof.

Processing system 620 includes storage system 621. Processing system 620 retrieves and executes software 622 from storage system 621. In some examples, processing system 620 is located within the same equipment in which network interface 610 or access interfaces 630 are located. Storage system 621 could include a computer-readable medium such as a disk, tape, integrated circuit, server, or some other memory device, and also may be distributed among multiple memory devices. Software 622 may include an operating system, logs, utilities, drivers, networking software, and other software typically loaded onto a computer system. Software 622 could contain an application program, firmware, or some other form of computer-readable processing instructions. When executed by processing system 620, software 622 directs processing system 620 to operate as described herein, such as route communications between a wireless communication device and communication services, as well as determine spreading codes for communication sessions with wireless communication devices.

Access interfaces 630 comprise communication interfaces for communicating with wireless communication devices. Access interfaces 630 could include transceiver equipment and antenna elements for exchanging user communications and overhead communications with wireless communication devices in a wireless communication system, omitted for clarity, over links 651. In some examples, two or more of links 651 are used to communicate with a single wireless communication device using different spreading codes. Access interfaces 630 also receive command and control information and instructions from processing system 620 for controlling the operations of wireless communication devices over links 651, as well as for coordinating handoffs of wireless communication devices between other wireless access nodes or base stations. Links 651 could each use various protocols or communication formats as described herein for wireless links 120-121 or 320, including combinations, variations, or improvements thereof.

Bus 640 comprises a physical, logical, or virtual communication link, capable of communicating data, control signals, and communications, along with other information. In some examples, bus 640 is encapsulated within the elements of network interface 610, processing system 620, or access interfaces 630, and may be a software or logical link. In other examples, bus 640 uses various communication media, such as air, space, metal, optical fiber, or some other signal propagation path, including combinations thereof. Bus 640 could be a direct link or might include various equipment, intermediate components, systems, and networks.

Referring back to FIG. 1, wireless communication device 110 comprises radio frequency (RF) communication circuitry and antenna elements. The RF communication circuitry typically includes amplifiers, filters, modulators, and signal processing circuitry. In many examples, wireless communication device 110 includes circuitry and equipment to exchange communications of multiple wireless communication services over multiple wireless links, such as wireless links 120-121. Wireless communication device 110 may also include user interface systems, memory devices, computer-readable storage mediums, software, processing circuitry, or some other communication components. Wireless communication device 110 may be a telephone, mobile wireless telephone, computer, e-book, mobile Internet appliance, wireless network interface card, media player, game console, or some other wireless communication apparatus, including combinations thereof.

Communication services 140-141 may each be an application server, emergency service, Internet service, application service, voice service, data service, multimedia service, or other communication service. The communication service provided by each of communication services 140-141 could include voice calls, data exchange, text messaging, multimedia streaming, Internet access, or other services. In other examples, each of communication services 140-141 is operated by an emergency service provider, such as police, fire, first responder, or other emergency service providers. Communication services 140-141 and links 122-123 could be encapsulated within the equipment of wireless access system 130.

Wireless access system 130 comprises RF communication and control circuitry, antenna elements, and communication routing equipment and systems. The RF communication circuitry typically includes amplifiers, filters, RF modulators, and signal processing circuitry. In many examples, wireless access system 130 includes equipment to provide communication services 140-141 to wireless communication device 110, and route communications between each of communication services 140-141 and wireless communication device 110. Wireless access system 130 may also comprise routers, servers, memory devices, software, processing circuitry, cabling, network communication interfaces, physical structural supports, or other communication apparatuses. Wireless access system 130 could include base stations, base transceiver stations, base station controllers (BSC), mobile switching centers (MSC), radio node controllers (RNC), call processing systems, authentication, authorization and accounting (AAA) equipment, access service network gateways (ASN-GW), Internet access nodes, telephony service nodes, wireless data access points, or other wireless communication systems, including combinations thereof. Wireless access system 130 may also comprise optical networks, asynchronous transfer mode (ATM) networks, packet networks, metropolitan-area networks (MAN), or other network topologies, equipment, or systems, including combinations thereof. In typical examples, wireless access system 130 includes many wireless access nodes and associated equipment for providing communication services to many wireless communication devices across a geographic region.

Wireless links 120-121 each use the air or space as the transport media. Wireless links 120-121 may each use various protocols, such as Code Division Multiple Access (CDMA), Evolution Data Optimized (EVDO), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), or some other wireless communication format, including combinations, improvements, or variations thereof. Although two wireless links 120-121 are shown in FIG. 1, it should be understood that these separate wireless links are merely illustrative to show two communication sessions. In other examples, a single wireless link could be shown, with portions of the single wireless link used for two communication sessions and associated overhead communications.

Communication links 122-123 each use metal, glass, optical, air, space, or some other material as the transport media. Communication links 122-123 could each use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof.

Links 120-123 may each include many different signals sharing the same link—as represented by the associated lines in FIG. 1—comprising access channels, forward links, reverse links, user communications, communication sessions, overhead communications, frequencies, channels, carriers, timeslots, transportation ports, logical transportation links, network sockets, packets, or communication directions. Communication links 120-123 could each be direct links or may include intermediate networks, systems, or devices. In many examples, the portion of wireless links 120-121 as transmitted by wireless communication device 110 is referred to an uplink or reverse link of the wireless link, while the portion as transmitted by wireless access system 130 is referred to as a downlink or forward link of the wireless link.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a communication system, the method comprising:
    receiving a first request to initiate a voice communication session with a wireless communication device;
    determining a first spreading code for the voice communication session;
    transferring the first spreading code for delivery to the wireless communication device;
    exchanging communications of the voice communication session using the first spreading code;
    receiving a second request to initiate a data communication session with the wireless communication device, wherein the voice communication session is at least partially concurrent with the data communication session;
    determining a second spreading code for the data communication session, wherein the second spreading code is determined based upon the first spreading code;
    transferring the second spreading code for delivery to the wireless communication device; and
    exchanging communications of the data communication session using the second spreading code.

2. The method of claim 1, further comprising:
    in the wireless communication device, transferring the first request to initiate the voice communication session, receiving the first spreading code, and exchanging communications of the voice communication session with a base station using the first spreading code; and
    in the wireless communication device, transferring the second request to initiate the data communication session during the first communications session, receiving the second spreading code, and exchanging communications of the data communication session with the base station using the second spreading code.

3. The method of claim 1, further comprising:
    exchanging communications of the voice communication session with the wireless communication device using the first spreading code, and exchanging communications of the data communication session with the wireless communication device using the second spreading code.

4. The method of claim 1, wherein the voice communication session comprises a voice call, and wherein the data communication session comprises an Internet protocol (IP) data session.

5. The method of claim 1, wherein determining the second spreading code based upon the first spreading code comprises optimizing the second spreading code for a low cross-correlation with the first spreading code.

6. The method of claim 1, wherein the first request to initiate the voice communication session indicates a first application type, and wherein the first spreading code is determined based upon the first application type.

7. The method of claim 1, wherein the second request to initiate the data communication session indicates a second application type, and wherein the second spreading code is determined based upon the first spreading code and the second application type.

8. A method of operating a communication system, the method comprising:
- in a wireless communication device, requesting to initiate a voice call through a wireless access system, receiving a first spreading code for the voice call, and exchanging communications of the voice call through the wireless access system using the first spreading code;
- in the wireless communication device, requesting to initiate a data session through the wireless access system, wherein the data session is at least partially concurrent with the voice call, receiving a second spreading code for the data session, wherein the second spreading code is determined based upon the first spreading code, and exchanging communications of the data session through the wireless access system using the second spreading code.

9. The method of claim 8, further comprising:
- in the wireless access system, establishing the voice call with the wireless communication device, determining the first spreading code, transferring the first spreading code to the wireless communication device, and exchanging communications of the voice call with the wireless communication device; and
- in the wireless access system, establishing the data session with the wireless communication device, determining the second spreading code, transferring the second spreading code to the wireless communication device, and exchanging communications of the data session with the wireless communication device.

10. The method of claim 8, wherein requesting to initiate the data session through the wireless access system comprises indicating an application type, and wherein the second spreading code is determined based upon the first spreading code and the application type.

11. The method of claim 10, wherein determining the second spreading code based upon the first spreading code and the application type comprises optimizing the second spreading code for a diversity quality factor and a cross-correlation quality factor when the application type indicates voice over IP (VoIP) communications.

12. The method of claim 10, wherein determining the second spreading code based upon the first spreading code and the application type comprises optimizing the second spreading code for an auto-correlation quality factor and a diversity quality factor when the application type indicates web page communications.

13. The method of claim 9, wherein determining the first spreading code comprises optimizing the first spreading code for a diversity quality factor and a cross-correlation quality factor.

14. The method of claim 8, wherein the second spreading code is determined based upon the first spreading code and an activity level of a sector of the wireless access system, and wherein the wireless communication device is located within the sector.

15. A communication system, comprising:
- a wireless communication device configured to transfer a first request for a voice communication session to a wireless access system, receive a first spreading code for the voice communication session, and exchange communications of the voice communication session using the first spreading code;
- the wireless access system configured to establish the voice communication session with the wireless communication device based upon the first request, determine the first spreading code, transfer the first spreading code for delivery to the wireless communication device, and exchange the communications of the voice communication session with the wireless communication device using the first spreading code;
- the wireless communication device configured to transfer a second request for a data communication session to the wireless access system, receive a second spreading code for the data communication session, and exchange communications of the data communication session using the second spreading code, wherein the data communication session is at least partially concurrent with the voice communication session;
- the wireless access system configured to establish the data communication session with the wireless communication device based upon the second request, determine the second spreading code based upon the first spreading code, transfer the second spreading code for delivery to the wireless communication device, and exchange the communications of the data communication session with the wireless communication device using the second spreading code.

16. The communication system of claim 15, wherein the voice communication session comprises a voice call, and wherein the data communication session comprises an Internet protocol (IP) data session.

17. The communication system of claim 16, wherein the wireless access system is configured to optimize the first spreading code for a diversity quality factor and a cross-correlation quality factor.

18. The communication system of claim 16, wherein the wireless access system is configured to optimize the second spreading code for an auto-correlation quality factor and a diversity quality factor.

19. The communication system of claim 15, wherein the wireless access system is configured to optimize the second spreading code for a low cross-correlation with the first spreading code to determine the second spreading code based upon the first spreading code.

20. The communication system of claim 15, wherein the wireless access system is configured to determine the second spreading code based upon the first spreading code and an activity level of a sector of the wireless access system, and wherein the wireless communication device is located within the sector.

* * * * *